(12) United States Patent
Fuchigami et al.

(10) Patent No.: US 7,006,253 B2
(45) Date of Patent: Feb. 28, 2006

(54) IMAGE PROCESSING APPARATUS

(75) Inventors: Takahiro Fuchigami, Yokosuka (JP); Naofumi Yamamoto, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1012 days.

(21) Appl. No.: 09/843,844

(22) Filed: Apr. 30, 2001

(65) Prior Publication Data

US 2002/0159106 A1    Oct. 31, 2002

(51) Int. Cl.
*H04N 1/58* (2006.01)
*H04N 1/60* (2006.01)
*G06T 5/40* (2006.01)
*G06T 7/00* (2006.01)

(52) U.S. Cl. ............... 358/2.1; 358/3.27; 358/462; 382/164; 382/171; 382/176

(58) Field of Classification Search ............. 358/1.9, 358/2.1, 3.24, 3.27, 462, 530, 518, 529, 532, 358/538; 382/162, 164, 168, 171, 173, 176
See application file for complete search history.

(56) References Cited

U.S. PATENT DOCUMENTS

| | | | | |
|---|---|---|---|---|
| 4,813,078 A | * | 3/1989 | Fujiwara et al. | 382/185 |
| 4,926,251 A | | 5/1990 | Sekizawa et al. | 358/535 |
| 5,583,646 A | | 12/1996 | Yamamoto et al. | 358/296 |
| 6,424,742 B1 | * | 7/2002 | Yamamoto et al. | 382/173 |
| 2002/0171854 A1 | * | 11/2002 | Yamamoto et al. | 358/1.9 |

FOREIGN PATENT DOCUMENTS

JP          10-040373          2/1998

OTHER PUBLICATIONS

U.S. Appl. No. 09/136,929, filed Aug. 20, 1998, Naofumi Yamamoto et al.

* cited by examiner

*Primary Examiner*—Scott A. Rogers
(74) *Attorney, Agent, or Firm*—Foley & Lardner LLP (57) ABSTRACT

A number of character string determination sections determine whether a pixel of interest corresponds to a character or a line drawing. The character string determination sections use mutually different determination methods. A character determination selector section selects a determination result output from the character determination section that uses a determination method most suited to a background sensing result obtained by a background sensing section. In this manner, either the character or the line drawing can be determined using an efficient method in accordance with the background state of a color image.

9 Claims, 8 Drawing Sheets

MAIN (SUB) SCAN POSITION

IMAGE PROCESSING APPARATUS

BACKGROUND OF THE INVENTION

The present invention relates to an image processing apparatus adapted for use in an image forming apparatus, which is, for example, a color copying machine for forming color images.

A conventional image forming apparatus (color copying machine) forms an image, using four colors, namely, C (cyan), M (magenta), Y (yellow) and K (black). For this image formation, the color copying machine employs an image processing apparatus that converts an input image, which is comprised of image information read by a color scanner, into four-color (C, M, Y and K) image signals. The input image includes characters, line drawings or photographs. To cause the characters and line drawings to look sharp and clear, it is desired that a black (achromatic) image be formed in K only. On the other hand, a halftone image has to be printed as smoothly as possible. For this reason, it is desired the halftone image be printed in mixed colors of CMYK whether the original color of that image is black (achromatic) or other colors (chromatic). To meet this desire, the image processing apparatus of the color copying machine checks each of the pixels of an input image and determines whether it corresponds to a region of characters and line drawings or a region of halftone images.

For example, the image processing apparatus determines that the pixels of a character or a line drawing are achromatic when they are look similar to black; otherwise, it determines that the pixels are chromatic. Based on this determination by the image processing apparatus, the color copying machine executes image formation in such a manner that a black character or line drawing is developed in black (K) only, and that a halftone image and a color character or line drawing is developed in color (CMYK).

In the case of a color image, the edge of a character or a line drawing may undergo a color variation for each color component. For example, the color scanner of a color copying machine reads the density of a pixel for each color component, and a significant density difference between the color components may be detected on the edge of a black character.

If such a color variation occurs on the edge of a black character or the like, the conventional image processing apparatus may undesirably determine that the color variation portion is chromatic. As a result, the color copying machine executes image formation in such a manner that an image portion that should be printed in black is printed in color (CMYK).

BRIEF SUMMARY OF THE INVENTION

The present invention has been conceived in an effort to provide the problem wherein a color variation on the edge of a black character or line drawing gives rise to a portion being regarded as chromatic even though it should be achromatic. Accordingly, the object of the present invention is to provide an image processing apparatus which prevents erroneous determination of "chromatic" when a color variation occurs on the edge of a character or line drawing, and which enables reliable "achromatic" determination even for the edge of a black character or line drawing.

An image processing apparatus of the present invention is adapted for processing color images and comprises: a feature amount calculation section for calculating a feature amount with respect to a pixel of interest; a background sensing section for sensing a background density or a background color with respect to a region surrounding the pixel of interest whose feature amount is calculated by the feature amount calculation section; a plurality of character determination sections for determining whether the pixel of interest corresponds to a character or a line drawing on the basis of the feature amount calculated by the feature amount calculation section, the plurality of character determination sections using mutually different determination methods; and a character determination selector section for selecting one of determination results output from the character determination sections in accordance with a sensing result output from the background sensing section.

Another image processing apparatus of the present invention is adapted for processing color images and comprises: a plurality of feature amount calculation sections for determining feature amounts with respect to a pixel of interest by using mutually different determination methods; a background sensing section for sensing a background density or a background color with respect to a region surrounding the pixel of interest whose feature amount is calculated by the feature amount calculation sections; a feature amount selection section for selecting one of calculation results output from the feature amount calculation sections in accordance with a sensing result output from the background sensing section; and a character determination section for determining whether the pixel of interest is a character or a line drawing on the basis of a feature amount selected by the feature amount selection section.

A still another image processing apparatus of the present invention is adapted for processing color images and comprises: a feature amount calculation section for calculating a feature amount with respect to a pixel of interest; a background sensing section for sensing a background density or a background color with respect to a region surrounding the pixel of interest; a plurality of color determination sections for determining colors with respect to the pixel of interest on the basis of a chroma and/or a hue thereof, the color determination sections using mutually different determination methods; and a color determination selector section for selecting one of determination results output from the color determination sections in accordance with the feature amount the feature amount calculation section determines with respect to the pixel of interest or the background density or color the background sensing section senses.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

One embodiment of the present invention will now be described with reference to the accompanying drawings.

Figure 1:
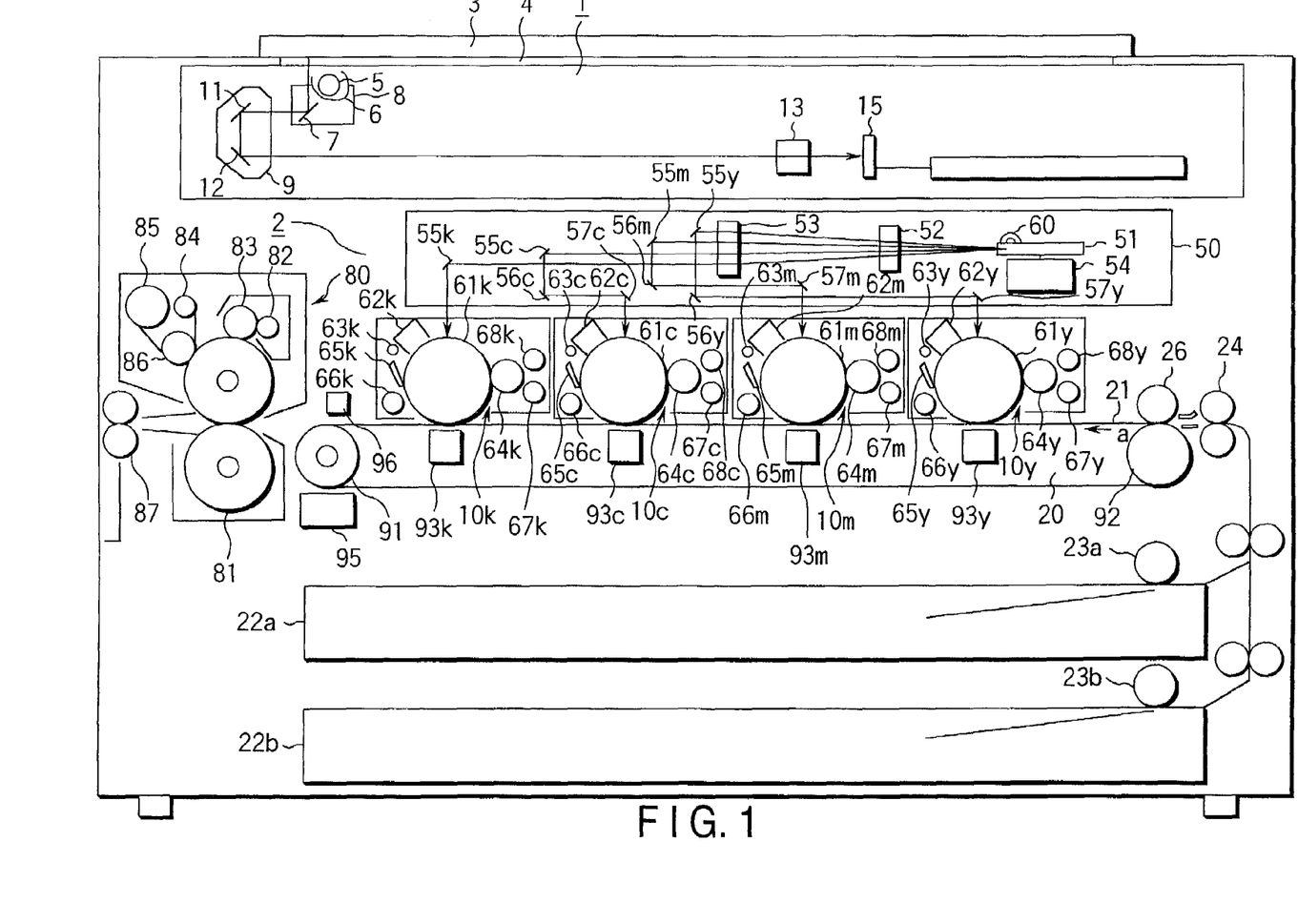
FIG. 1 schematically shows the internal structure of a color image forming apparatus according to the present invention, which is, for example, a digital color copying machine that forms a duplicate image of a color image.

FIG. 1 schematically shows the internal structure of a color image forming apparatus according to the present invention, which is, for example, a digital color copying machine that forms a duplicate image of a color image. Broadly speaking, the color image forming apparatus is made up of: a color scanner 1 functioning as an image reader for reading a color image from a document; and a color printer 2 functioning as an image forming section for forming a duplicate image of a read color image.

The color scanner 1 has a document table cover 3 on top, and a document table 4 which opposes the document table cover 3 when it is covered with the document table cover 3. Arranged under the document table 4 are: an exposure lamp 5 for illuminating a document placed on the document table 4 with light; a reflector 6 for condensing the light from the exposure lamp on the document; and a first mirror 7 for guiding the light from the document in the leftward direction as viewed in the Figure. The exposure lamp 5, reflector 6 and first mirror 7 are fixed to a first carriage 8. The first carriage 8 moves in parallel to the lower surface of the document table 4 when it is driven by a pulse motor (not shown) by means of a toothed belt, etc.

A second carriage 9 is located at a position which is depicted to the left of the first carriage 8 in the Figure, i.e., at the position to which the light reflected by the first mirror 7 is guided. The second carriage 9 is driven by a driving mechanism (not shown), such as a toothed belt and a DC motor) and movable in parallel to the document table 4. The second carriage 9 is provided with: a second mirror 11 for receiving the reflected light coming from the document and guided by the first mirror 7 and directing that light in the downward position as viewed in the Figure; and a third mirror 12 for receiving the reflected light from the second mirror 11 and directing that light in the rightward direction as viewed in the Figure. The second carriage 9 is driven in such a manner as to follow the first carriage 8, and moves in parallel to the document table 4 at a speed half that of the first carriage 8.

A focusing lens 13 is arranged in a plane containing the optical axis of the light whose traveling direction is changed by the first and second mirrors 11 and 12. The focusing lens 13 serves to focus the reflected light from the third mirror 12 at a predetermined power. A CCD color image sensor (a photoelectric conversion element) 15 arranged in a plane substantially perpendicular to the optical axis of the light which has passed through the focusing lens 13. The CCD color image sensor 15 serves to convert the reflected light, which is converged by the focusing lens 13, into electric signals.

When the reflector 6 focuses the light from the exposure lamp 5 on the document placed on the document table 4, the reflected light from the document passes via the first mirror 7, second mirror 11 and third mirror 12, and is then incident on the color image sensor 15 after passing through the focusing lens 13. By this color image sensor 15, the incident light is converted into electric signals corresponding to the primary three colors of R (red), G (green) and B (blue).

The color printer 2 is provided with first to fourth image forming sections 10y, 10m, 10c and 10k, which form images in four colors, namely, yellow (Y), magenta (M), cyan (C) and black (K).

A conveyance mechanism 20 including a conveyance belt 21 is located below the image forming sections 10y, 10m, 10c and 10k. The conveyance belt 21 serves as a conveyance section for conveying the different-color images formed in the image forming sections in the direction indicated by arrow a in the Figure. The conveyance belt 21 is stretched between a driving roller 91, which is rotated in the direction of arrow a by a motor (not shown), and a driven roller 92 located away from the driving roller 91 by a predetermined distance. The conveyor belt 21 is driven endlessly in the direction of arrow a at a constant speed. The image forming sections 10y, 10m, 10c and 10k are arranged in series in the running direction of the conveyor belt 21.

The image forming sections 10y, 10m, 10c and 10k include photosensitive drums 61y, 61m, 61c and 61k, respectively. These photosensitive drums are in contact with the conveyor belt 21, and their outer circumferential surfaces are rotatable in the same direction. That is, each of the photosensitive drums serves as an image carrier. The photosensitive drums 61y, 61, 61c and 61k are rotated at a constant circumferential speed by a motor (not shown).

The photosensitive drums 61y, 61m, 61c and 61k are arranged in such a manner that their axes are equidistant from each other. The axes extend in the direction orthogonal to the direction in which images are fed by the conveyance belt 21. In the description below, the axial direction of each photosensitive drums 61y, 61m, 61c and 61k is assumed to be the main scan direction (second direction), and the rotating direction of the conveyance belt 21 (i.e., the direction of arrow a in the Figure) is assumed to be the sub scan direction (first direction).

Arranged around each photosensitive drum 61y (61m, 61c, 61k) are: a charging unit 62y (62m, 62c, 62k) extending in the main scan direction and serving as a charging section; a discharging unit 63y (63m, 63c, 63k); a developing roller 64y (64m, 64c, 64k) extending in the main scan direction and serving as a developing section; a lower agitating roller 67y (67m, 67c, 67k); an upper agitating roller 68y (68m, 68c, 68k); a transfer device 93y (93m, 93c, 93k) extending in the main scan direction and serving as a transfer section; a cleaning blade 65y (66m, 66c, 66k) extending in the main scan direction; and a residual toner recovery screw 66y (66m, 66c, 676). These structural elements are arranged in the rotating direction of the corresponding photosensitive drum 61y (61m, 61c, 61k).

Each transfer device 93y (93m, 93c, 93k) is arranged in such a manner that it sandwiches the conveyance belt 21 in cooperation with the corresponding photosensitive drum 61y (61m, 61c, 61k). In other words, each transfer device is located inside the conveyance belt 21. An exposure point of an exposure unit 50 to be described later is a point which is on the outer circumference of the photosensitive drum 61y (61m, 61c, 61k) and which is between the charging unit 62y (62m, 62c, 62k) and the developing roller 64y (64m, 64c, 64k).

Sheet cassettes 22a and 22b, each containing a plurality of sheets P (image formation mediums) on which images formed by the image forming sections 10y, 10m, 10c and 10k are transferred, are arranged under the conveyance mechanism 20.

The sheet cassettes 22a and 22b are provided with pickup rollers 23a and 23b at the end closer to the driven roller 92. By these pickup rollers 23a and 23b, sheets contained in the sheet cassettes 22a and 22b are taken out one by one. Register rollers 24 are arranged between the driven roller 92 and the pickup rollers 23a and 23b so as to attain matching between the forward end of a sheet P taken out from the sheet cassette 22a or 22b and the forward end of the toner image formed on the photosensitive drum 61y of the image forming section 10y.

The toner images on the other photosensitive drums 61m, 61c and 61k are supplied to their respective transfer positions in accordance with the timings at which the sheet P on the conveyance belt 21 is fed.

An attraction roller 26 is arranged at a position which is between the register rollers 24 and the first image forming section 10y and which is located in the neighborhood of the driven roller 92. At that position, the attraction roller 26 presses the conveyance belt 21 against the outer circumference of the driven roller 92. The attraction roller 26 serves to provide an attraction force for the sheet P, which is fed at the predetermined timing through the use of the register rollers 24. The axis of the attraction roller 26 and that of the driven roller 92 are parallel to each other.

At one end of the conveyance belt 21, a positional error sensor 96 is arranged in such a manner that it is located in the neighborhood of the driving roller 91. The positional error sensor 96 is located near the outer circumference of the driving roller 91, with the conveyance belt 21 situated therebetween. The positional error sensor 96 serves to sense the position of an image formed on the conveyance belt 21. The positional error sensor 96 is made of an optical sensor of transmission or reflection type.

A conveyance belt cleaning unit 95 is arranged near the outer circumference of the driving roller 91. The conveyance belt cleaning unit 95 is on the conveyance belt 21 and located downstream of the positional error sensor 96. The conveyance belt cleaning unit 95 serves to remove toner or paper chips of sheet P from the conveyance belt 21.

A fixing unit 80 is arranged at a position to which sheets P conveyed by the conveyance belt 21 are separated therefrom and guided. The fixing unit 80 melts the toner image by heating the sheets P, thereby fixing the toner image on the sheets P. The fixing unit 80 includes a pair of heat rollers 81, oil coating rollers 82 and 83, a web take-up roller 84, a web roller 85 and a web push roller 86. Toner on a sheet P is fixed, and then sheet P is discharged by a pair of discharge rollers 87.

The exposure device 50 forms color-separated electrostatic latent images on the outer circumferences of the photosensitive drums 61y, 61m, 61c and 61k. The exposure device 50 includes a semiconductor laser oscillator 60, and the light emission of this oscillator is controlled on the basis of image data (y, m, c, k) for each color. The image data are obtained by the color separation by an image processing apparatus 36. On the optical path of the semiconductor laser oscillator 60, a polygon mirror 51 and fθ lenses 52 and 53 are provided in the order mentioned. The polygon mirror 51 is driven by a polygon motor 54 and reflects and scans a laser beam. The fθ lenses 52 and 53 serve to adjust the focal position of the laser beam reflected by the polygon mirror 51.

A first return mirror 55y (55m, 55c, 55k) and second and third return mirrors 56y (56m, 56c) and 57y (57m, 57c) are located between the fθ lens 53 and each photosensitive drum 61y (61m, 61c, 61k). The first return mirror 55y (55m, 55c, 55k) reflects the laser beam of each color when it has passed through the fθ lens 53 and guides the reflected light beam toward the exposure position of each photosensitive drum 56y (61m, 61c, 61k). The second and third return mirrors 56y (56m, 56c) and 57y (57m, 57c) receives the laser beam guided by the first return mirror 55y (55m, 55c) and reflects it in the intended directions.

The laser beam corresponding to "black" is reflected by the first return mirror 55k and then falls on the photosensitive drum 61k without passing via other mirrors.

Figure 2:
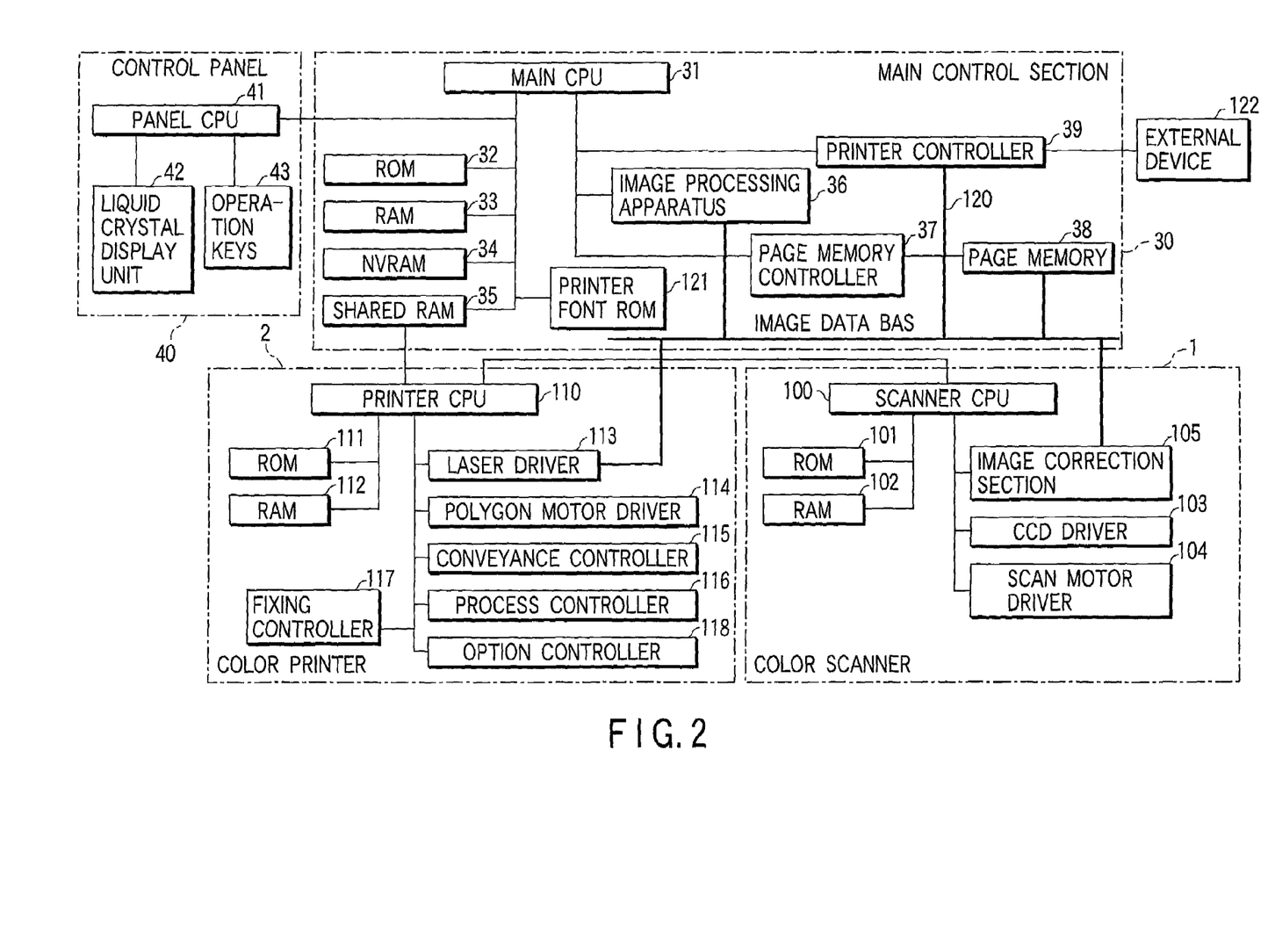
FIG. 2 is a block circuit diagram illustrating how electrical connections are made in the color image forming apparatus depicted in FIG. 1 and how signals are made to flow for control.

FIG. 2 is a block circuit diagram illustrating how electrical connections are made in the color image forming apparatus depicted in FIG. 1 and how signals are made to flow for control. Referring to FIG. 2, the control system comprises a main CPU (central processing unit) 31 incorporated in a main control section 30; a scanner CPU 100 incorporated in the color scanner 1; and a printer CPU 110 incorporated in the color printer 2.

The main CPU 31 executes two-way communication with the printer CPU 110 through the use of a shared RAM (random access memory) 35. To be more specific, the main CPU 31 issues an operation command and the printer CPU 110 sends a status signal to the main CPU 31. The printer CPU 110 and the scanner CPU 100 execute serial communication. The printer CPU 110 issues an operation command, and the scanner CPU 100 sends a status signal to the scanner CPU 100.

A control panel 40 comprises a liquid crystal display unit 42, operation keys 43 of various kinds, and a panel CPU 41 to which they are connected. The control panel 40 is connected to the main CPU 31.

The main control section 30 comprises the main CPU 31, a ROM (read-only memory) 32, a RAM 33, an NVRAM 34, a shared RAM 35, an image processing apparatus 36, a page memory controller 37, a page memory 38, a printer controller 39 and a printer font ROM 121.

The main CPU 31 performs overall control. The ROM 32 stores a control program or the like. The RAM temporarily stores data.

The NVRAM 34 (a nonvolatile random access memory; a nonvolatile RAM) is a nonvolatile memory backed up with a battery (not shown). It retains the data even when power supply thereto is cut off.

The shared RAM 35 is used for realizing two-way communication between the main CPU 31 and the printer CPU 110.

The page memory controller 37 controls the page memory 38 in such a manner that image information are recorded in the memory or read out therefrom. The page memory 38 has such an area as enables storage of image information corresponding to a plurality of pages. Data sent from the color scanner 1 and compressed by obtaining image information are stored in the page memory in units of one page.

The printer font ROM 121 stores font data corresponding to print data. The printer controller 39 develops print data sent from an external device 122 (e.g., a personal computer) into image data. This developing process is carried out using the font data stored in the print font ROM 121 in such a manner that the resultant image data has a resolution indicated by the resolution data attached to the print data.

The color scanner 1 comprises the scanner CPU 100 for performing overall control, a ROM 101 for storing a control program or the like, a RAM 102 for storing data, a CCD driver 103 for driving the color image sensor 15, a scan motor driver 104 for controlling the rotation of a scan motor (which is used for moving the first carriage 8 or the like), and an image correction section 105.

The image correction section 105 includes: an A/D conversion circuit for converting R, G and B analog signals output from the color image sensor 15 into digital signals; a shading correction circuit for correcting the variations of the threshold level used for an output signal from the color image sensor 15 (the variations are caused depending upon characteristic differences between color image sensors or variations in the environmental temperature); a line memory for temporarily storing digital signals obtained after the shading correction circuit executes shading correction; etc.

The color printer 2 comprises: the printer CPU 110 for executing overall control; a ROM 111 for storing a control program or the like; a RAM 112 for storing data; a laser driver 113 for driving the semiconductor laser oscillator 60; a polygon motor driver 114 for driving the polygon motor 54 of the exposure device 50; a conveyance controller 115 for controlling the conveyance of a sheet P by the conveyance mechanism 20; a process controller 116 for controlling the charging, developing and transferring processes executed by the charging units, developing rollers and transferring devices; a fixing controller 117 for controlling the fixing unit 80; and an option controller 118 for controlling options.

The image processing apparatus 36, the page memory 38, the printer controller 39, the image correction section 105 and the laser driver 113 are connected together by means of an image data bus 120.

Figure 3:
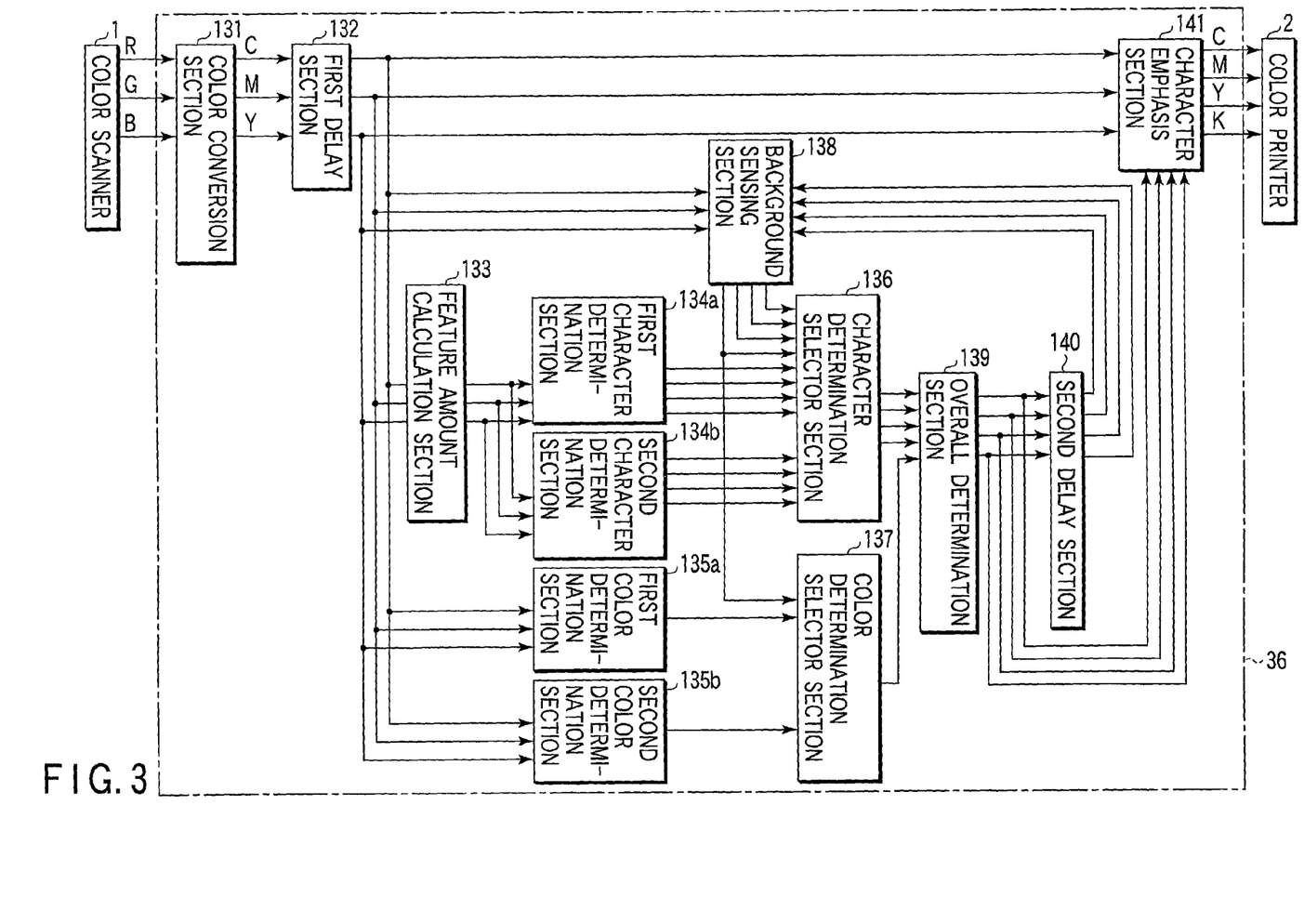
FIG. 3 is a block circuit diagram schematically showing a structural example of the image processing apparatus.

FIG. 3 schematically shows a first structural example of the image processing apparatus 36 described above. As shown in FIG. 3, the image processing apparatus 36 includes a color conversion section 131, a first delay section, a feature amount calculation section 133, a first character determination section 134a, a second character determination section 134b, a first color determination section 135a, a second color determination section 135b, a character determination selector section 136, a color determination selector section 137, a background sensing section 138, an overall determination section 139, a second delay section 140 and a character emphasis section 141.

The color scanner 1 is a processing section for causing a line sensor to optically read a document placed on the document table, and for executing A/D conversion and range correction to generate RGB image signals. The RGB image signals generated by this color scanner 1 are supplied to the color conversion section 131.

The color conversion section 131 is a processing section, which receives the RGB image signals sent from the color scanner 1, and converts them into CMY image signals. These CMY image signals represent the image-formation component colors (ink colors) used by the color printer 2. The CMY image signals obtained by the conversion by the color conversion section 131 are supplied to the first delay section 132. It should be noted that the processing performed by the color conversion section 131 is not limited to the conversion from RGB image signals to CMY image signals. Instead of such conversion, conversion may be so executed as to produce image signals required for determining whether an image to be processed is a character image (drawing line image) to be described later or a halftone image. In addition, the color conversion section 131 may be so designed as to execute color conversion after the image is determined to be either a character image (drawing line image) or a halftone image. In this case, each sections of the color printer 2 first perform processing with respect to the RGB image signals, and then the RGB image signals subjected to the processing by each section are converted into CMY image signals.

The first delay section 132 is a processing section for simultaneously outputting image signals to the succeeding processors. The image signals that are output simultaneously correspond to the number of lines required for feature amount extraction or color determination. For example, in the description below, the first region required for the processing executed by the feature amount calculation section 133 is a region of 5×5 pixels wherein a pixel of interest is at the center. Likewise, the third region required for the processing performed by first and second color determination sections 135a and 135b is a region of 3×3 pixels wherein a pixel of interest is at the center. Further, the second region required for the processing executed by the background sensing section 138 is a region of 9×9 pixels, which is part of an already-processed line including a line having a pixel of interest. As can be from these, the delay processing by the first delay section 132 requires delay processing of at least one line.

Needless to say, the number of delay lines described above is merely an example. The number of delay lines can be arbitrarily determined as long as it enables feature amount calculation, color determination processing and background sensing processing.

Figure 4:
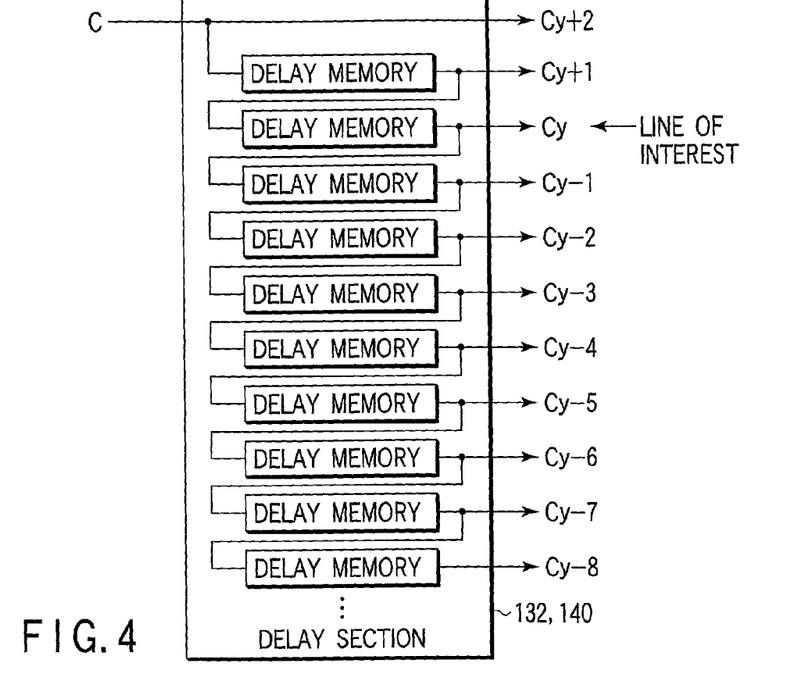
FIG. 4 schematically shows a structure of a delaying section.
Figure 5:
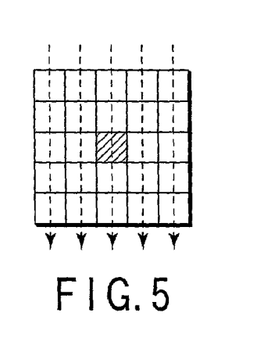
FIG. 5 illustrates how a feature amount is calculated with respect to a pixel of interest.
Figure 6:
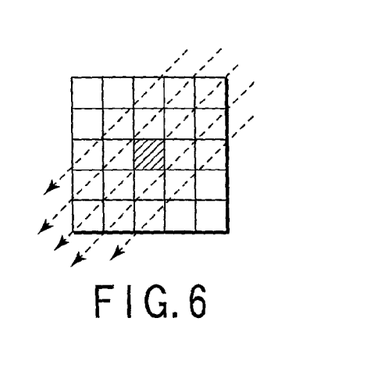
FIG. 6 also illustrates how a feature amount is calculated with respect to a pixel of interest.
Figures 7, 8:
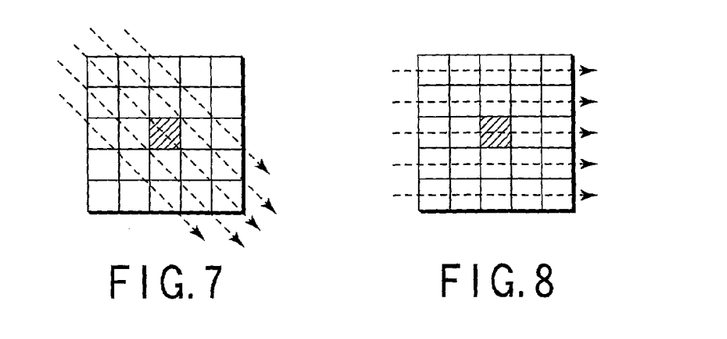
FIG. 7 also illustrates how a feature amount is calculated with respect to a pixel of interest.
FIG. 8 also illustrates how a feature amount is calculated with respect to a pixel of interest.

FIG. 4 schematically shows a structural example of the first delay section 132. As shown in FIG. 4, the first delay section 132 comprises eleven output signal lines for each color signal (C, M, Y). In FIG. 3, these output signal lines for each color signal (C, M, Y) are depicted as one line, for the sake of simplicity.

The feature amount calculation section 133 is a processing section for calculating a feature amount with respect to a pixel of interest on the basis of the density variations, and for outputting the feature amount. The feature amount represents a variation in the density of the pixel of interest and takes a large value at the edge of a character or line drawing. FIGS. 5 to 8 illustrate examples in which the feature amount calculation section 133 calculates a feature amount. First of all, the feature amount calculation section 133 determines a region of 5×5 pixels (first region) with reference to a pixel of interest (indicated with the oblique lines). In this region, the absolute values of the density variation are detected in four directions, as shown in FIGS. 5 to 8. Of these density variations, the one which differs from the density variation detected in the 90° direction by the greatest difference is output as the feature amount.

The difference determined with reference to the 90° direction is taken into account. By so doing, it is possible to the phenomenon wherein the density variation tends to increase in all directions in the case of a dot, whereas it tends to increase in a particular direction in the case of a line. The density variation represents density gradients detected in different directions in the first region, or color differences between the pixels. To be more specific, the maximal value of the density differences which are detected between the pixels in each direction in the 5×5 pixel region containing a pixel of interest is used as the density variation. The cumulative total of the density differences between pixels may be used instead.

The first and second character determination sections 134*a* and 134*b* are sections for determining whether the image under examination is a character or not. For this determination, they compare feature amounts of pixels of interest with predetermined reference values. It should be noted that the first and second character determination sections 134*a* and 134*b* use different reference values or different ways of determination and executes operations predetermined for their respective purposes. Outputs from the first and second character determination sections 134*a* and 134*b* indicate results of determination obtained for each of CMYK colors. The structural example shown in FIG. 3 includes two character determination sections, but may include three or more character determination sections.

The first and second color determination sections 135*a* and 135*b* are processing sections for determining whether the color information on a pixel of interest indicate either "chromatic" or "achromatic." The first and second color determination sections 135*a* and 135*b* compare the chroma value extracted from the color information on a pixel of interest with their predetermined reference values, so as to determine either "chromatic" or "achromatic."

The first and second determination sections 135*a* and 135*b* differ in the reference values they use for comparison, but they may employ different ways for chroma determination. There are a number of chroma determination methods the color determination sections can employ. For example, the difference between the maximum and minimum values of CMY three colors may be utilized. Alternatively, the weighted square sum of the differences between each of the CMY three colors and the average value of the CMY three colors may be used. The structural example shown in FIG. 3 employs two color determination sections, but may include three or more color determination sections.

The character determination selector section 136 is a processing section for selecting either an output result of the first character determination section 134*a* or an output result of the second character determination section 134*b*. In other words, the character determination selector section 136 selects one of the determination results obtained by a number of character determination sections. The character determination selector section 136 selects either the output result of the first character determination section 134*a* or the output result of the second character determination section 134*b* on the basis of the output result of the background sensing section 138.

Let us consider the case where a feature amount for character determination is calculated on the basis of the density variation between pixels. In this case, the character detecting accuracy of the character determination selector section 136 undesirably deteriorates in accordance with an increase in the background density. For this reason, if the background density is higher than a predetermined value, it may be desirable to select a character determination method that tends to determine a pixel of interest to be part of a character.

Like the character determination selector section 136, the color determination selector section 137 is a processing section for selecting either the output result of the first color determination section 135*a* or the output result of the second color determination section 135*b*. In other words, the color determination selector section 137 selects one of the determination results obtained by a number of color determination sections, and this selection is carried out on the basis of the output result of the background sensing section, which will be described later.

The color variation caused by a scanner has different effects on the color determination, depending upon the presence or absence of a background density. (In other words, a black character on a white background and a black character on another type of background have different effects on the occurrence of a color determination error in regions surrounding a character.) Therefore, when the background density is higher than the predetermined value, it may be desirable to select a character determination method that tends to determine a pixel of interest to be chromatic.

The overall determination section 139 is a processing section for performing character determination for each of the CMKY colors. By checking the combination between the selection result of the character determination selector section 136 and the selection result of the color determination selector section 137, the overall determination section 139 performs character determination for each of the CMKY colors.

Let us consider the case where the results by the character determination selector section 136 indicate "character" for each of the CMKY colors. If, in this case, the result of the color determination selector section 137 indicates "achromatic", then "CMY" colors do not represent a character, and only "K" represents a character. Conversely, if the result of the color determination selector section 137 indicates "chromatic", then only the corresponding one of the "CMY" colors represents a character, and "K" does not represent a character.

The second delay section 140 is a processing section for accumulating and delaying results of the overall determination section 139 and for synchronizing them with a CMY image signal output from the first delay section 132. Like the first delay section 132, the second delay section 140 has such a structure as is shown in FIG. 4.

The background sensing section 138 receives CMY image signals output from the first delay section 132 and identification signals output from the second delay section 140. The background sensing section 138 prepares density histograms corresponding to the CMY colors and the average value (K) of these colors, with respect to those pixels which are other than the pixels determined to represent a character. Based on the density histograms, the peak densities are compared with predetermined reference values, so as to determine the presence or absence of a background density.

The background sensing results corresponding to the respective colors are supplied to both the character determination selector section 136 and the color determination selector section 137. Upon receipt of the results, the character determination selector section 136 determines the character determination section whose result is to be selected. Likewise, the color determination selector section 137 determines the color determination section whose result is to be selected. Owing to this, the image processing apparatus 36 as a whole switches methods for character or color determination from one to another in accordance with the background sensing result. In this manner, the character determination or determination can be carried out in an optimal determination method in accordance with the background sensing result. The optimal determination method used by the color determination selector section need not necessarily be based on the background sensing result; it may be selected in accordance with the feature amount calculated by the feature amount calculation section.

The method in which the background sensing section 138 is operated and the kinds of signals output therefrom are not limited to those described above. For example, the frequency at which the peak density appears at the density histogram corresponding to each color may be compared with a predetermined value, and a signal representing whether or not the background density is detectable may be supplied to both the character determination selector section 136 and the color determination selector section 137.

The character emphasis section 141 is a processing section that executes the following: the processing for generating CMYK image signals from CMY image signals by adding "black" components; subjecting spatial filtering to the image signals of the respective colors; and gamma correction for the signal values of the respective colors. The processing performed by this character emphasis section 141 is controlled on the basis of an identification signal which is supplied from the overall determination section 139 when necessary.

Instead of employing the character emphasis section 141, the background sensing section 138 and the feature amount calculation section 133 may be provided with a low-pass filter and a high-pass filter, respectively. In this case, the background sensing section 138 senses a background and allows passage of only the high-frequency components of image signals (the high-frequency components of the signals are cut off). On the other hand, the feature amount calculation section 133 calculates feature amounts and allows passage of only the low-frequency components of image signals (the low-frequency components of the signals are cut off). In this manner, the emphasis processing can be carried out in parallel to other processing, and the need to provide the character emphasis section 141 is eliminated.

The color printer 2 obtains information on the amount of toner for each color on the basis of the CMYK image signals supplied from the character emphasis section 141. Based on the toner amount, the color printer 2 transfers an image onto a sheet.

With the above structure, a plurality of character string determination sections determine whether or not a pixel of interest is part of a character or line drawing in their respective determination methods. The character determination selector section selects the determination result of one of the character determination sections, using determination method that is optimal to the sensing result of the background.

In this manner, the determination of a character or line drawing is made in the most efficient determination method in accordance with the background state of the color image. Accurate and efficient image processing is thereby enabled for color images.

The second structural example of the image processing apparatus 36 will now be described.

Figure 9:
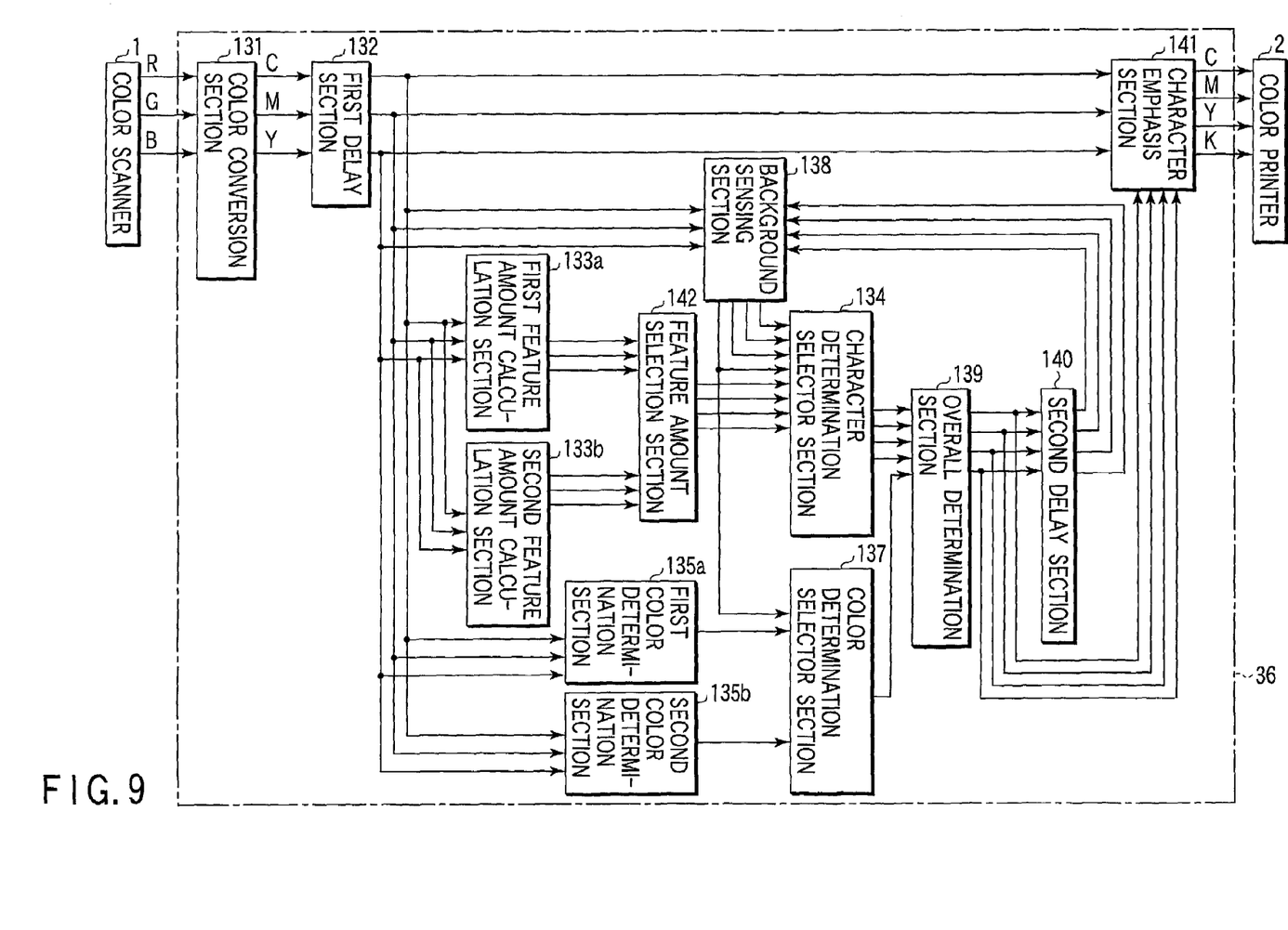
FIG. 9 is a block circuit diagram schematically showing a structural example of an image processing apparatus.

FIG. 9 schematically shows the second structural example of the image processing apparatus 36. As shown in FIG. 9, the image processing apparatus of the second structural example comprises a color conversion section 131, a first delay section 132, a first feature amount calculation section 133$a$, a second feature amount calculation section 133$b$, a character determination section 134, a first color determination section 135$a$, a second color determination section 135$b$, a color determination selector section 137, a background sensing section 138, an overall determination section 139, a second delay section 140, a character emphasis section 141, and a feature amount selection section 142.

The second structural example shown in FIG. 9 is similar to the first structural example shown in FIG. 3, except for the structures of the first feature amount calculation section 133$a$, second feature amount calculation section 133$b$, character determination section 134 and feature amount selection section 142. In the descriptions below, therefore, no reference will be made to similar structural components by attaching the same reference numerals as used in connection with the first structural example.

In the structural example shown in FIG. 9, a number of feature amount calculation sections (namely, the first feature amount calculation section 133$a$ and the second feature amount calculation section 133$b$) and the feature amount selection section 142 are arranged on the input side of the character determination section 134. The feature amount calculation sections 133$a$ and 133$b$ calculate feature amounts by using different calculation sections.

With respect to a region around a pixel of interest (such as the region shown in FIGS. 5 to 8), the first feature amount calculation section 133$a$ outputs a density variation amount as a feature amount, while the second feature amount calculation section 133$b$ outputs a density value multiplied by a predetermined coefficient. As a result, different feature amount calculation results are obtained.

The calculation results obtained by the feature amount calculation sections 133$a$ and 133$b$ are supplied to the feature amount selection section 142. In accordance with the sensing result of the background sensing section 138, the feature amount selection section 142 selects one feature amount from between the calculation results obtained by the feature amount calculation sections 133$a$ and 133$b$.

As described above, the feature amount calculation sections use different calculation methods to calculate feature amounts. The feature amount selection section identifies which feature amount calculation section uses the method that is suited to the background sensing result, and selects the calculation result output from that feature amount calculation section.

Owing to this feature, it is possible to use feature amount calculation result obtained in the method that provides the highest possible efficiency with respect to the background state of a color image. As a result, accurate and efficient image processing is ensured for the color image.

In the second structural example shown in FIG. 9, two feature amount calculation sections are employed. Needless to say, three or more feature amount calculation sections may be employed.

A number of regions that can be determined with reference to a pixel of interest P0 will be described.

Figure 10:
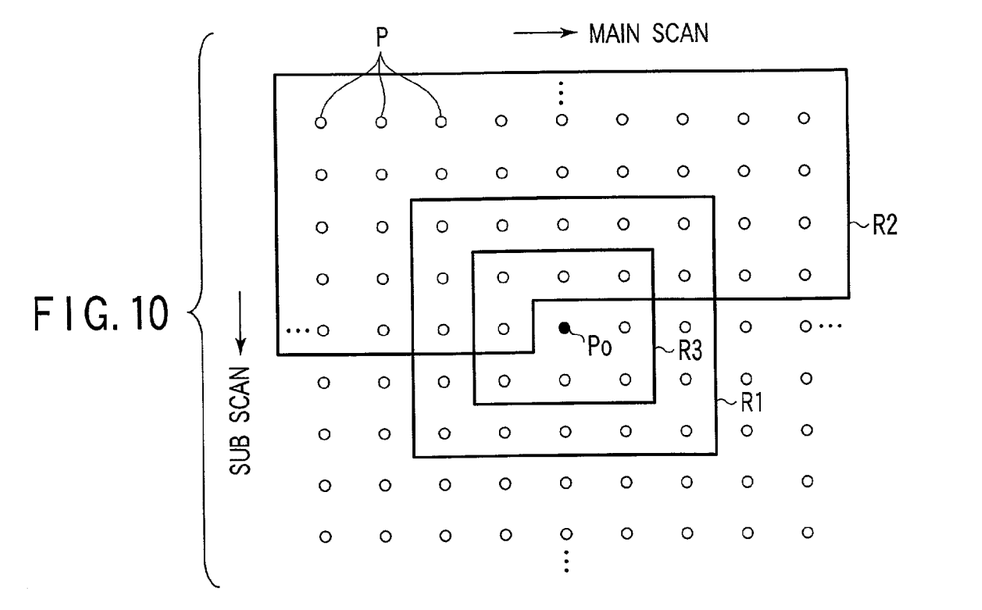
FIG. 10 shows how various areas can be set with reference to a pixel of interest.

FIG. 10 shows an example of a manner in which first, second and third regions R1, R2 and R3 are defined with reference to a pixel P0 of interest. In the example shown in FIG. 10, the first region R1 is a region for calculating a feature amount, the second region R2 is a region for sensing the background, and the third region R3 is a region for determining a color.

Like the region shown in FIGS. 5 to 8, the first region R1 is a region of 5 pixels (main scan direction)×5 pixels (sub scan direction). This region is determined with respect to the pixel P0 of interest and includes surrounding pixels P. The feature amount calculation section 133 calculates a feature amount, using the first region R1.

The second region R2 is a region with respect to which the background sensing section 138 senses the background. The second region is made up of pixels P located around the pixel P0 of interest; in other words, the pixels of the second region do not include the pixel P0 of interest. The second region R2 is the same in size as the first region R1, or is greater than the first region R1. The second region need not necessarily include the first region R1. In the example shown in FIG. 10, the second region R2 is made up of pixels that precede the pixel of interest in both the main and sub scan directions.

The third region R3 is a region the color determination section 135 (135a, 135b) uses for determining the color of the pixel of interest. The third region R3 is made up of pixels P located around the pixel P0 of interest; in other words, the pixels of the third region do not include the pixel P0 of interest. The third region R3 is a region of 3 pixels (main scan direction)×3 pixels (sub scan direction) It is determined with respect to the pixel P0 of interest and includes surrounding pixels P. In the example shown in FIG. 10, the third region R3 is inside the first region R1 and is therefore smaller than the first region.

A description will be given as to how the image signal of a character is featured in accordance with the background difference.

Figure 11:
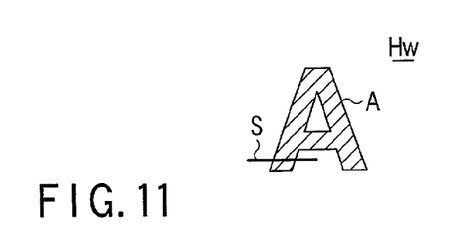
FIG. 11 shows an example of a read position at which a character on a white background is read.
Figure 12:
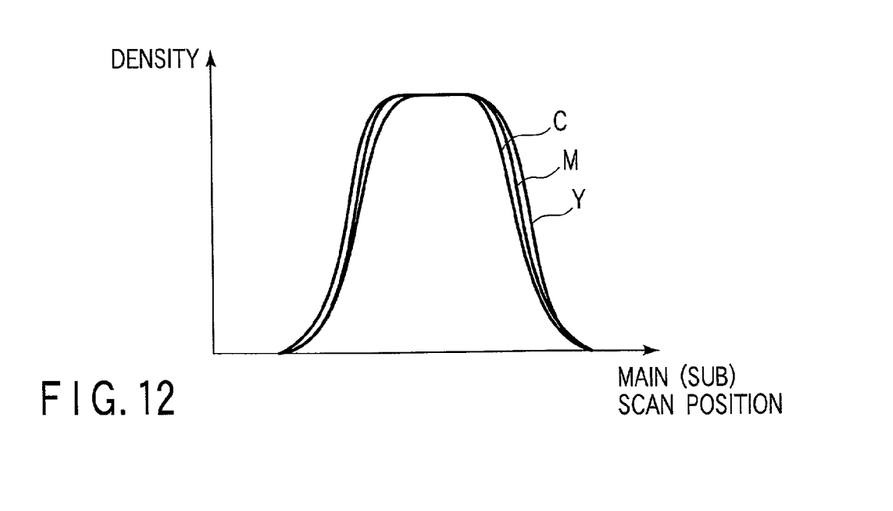
FIG. 12 shows how each color component is distributed with respect to the read position in FIG. 11.

FIG. 12 shows the density distribution obtained for each color component when part of letter "A" on a white background is scanned. In the example shown in FIG. 11, the color scanner 1 reads or scans the letter "A" on the white background Hw in such a manner that the read position S crosses part of the letter "A." The densities of the color components the color scanner 1 reads with respect to the read position S vary sharply, as shown in FIG. 12. As shown, all color components of the color image, namely cyan (c), magenta (M) and yellow (Y), describe a sharp curve at the edge of the letter.

In the density distribution shown in FIG. 12, the densities of the respective color components vary in the neighborhood of letter "A." In principle, the densities of the colors (CMY) are supposed to take on the same value in the neighborhood of the edge of the letter "A." The density variation is attributed to a minute error (color variation) occurring at the read position of the color scanner 1. A detailed description will be given later of the color component density variation in the neighborhood of the edge of the letter "A."

Figure 13:
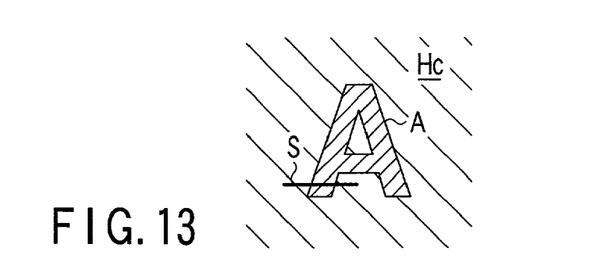
FIG. 13 shows an example of a read position at which a character on a color (cyan) background is read.
Figure 14:
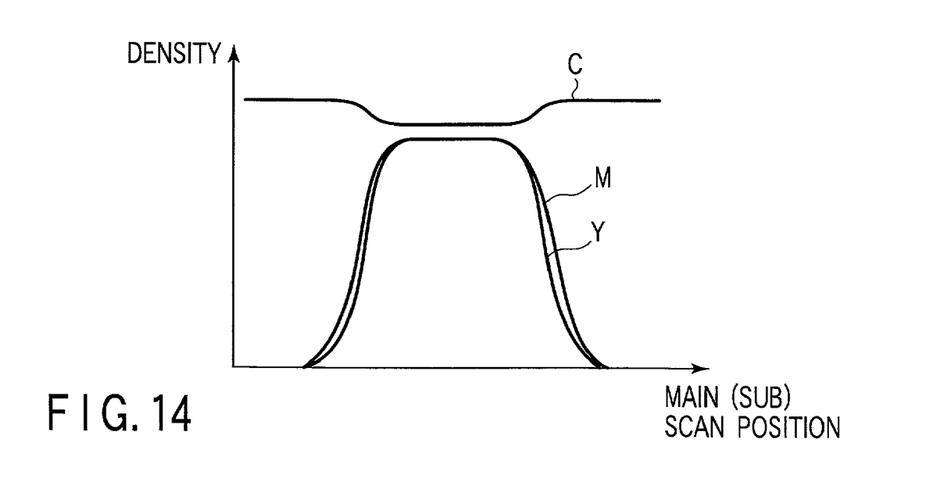
FIG. 14 shows how each color component is distributed with respect to the read position in FIG. 13.

FIG. 14 shows a density distribution obtained when part of letter "A" on a colored background (cyan background) is scanned, as shown in FIG. 13. In the example shown in FIG. 13, the color scanner 1 reads or scans the letter "A" on the colored (cyan) background Hc in such a manner that the read position S crosses part of the letter "A." The color components the color scanner 1 reads from the read position S have such a feature as is shown in FIG. 14. As shown, the C (cyan) component, which is the background, is high in density, and the M (magenta) and Y (yellow) components are also high at the positions corresponding to the letter.

As can be seen from the above, when the background is colored, the colors other than the color of the background exhibit a sharp density variation in the neighborhood of a character or letter, and the background color (or a color included in that background color) exhibits a gentle density variation. When a density variation is sensed for the determination of a character or letter, the method used for this determination should be changed in accordance with the color of the background of the character or letter.

In the density distribution shown in FIG. 14, the densities of the M and Y components show a significant variation in the neighborhood of the edge of letter "A." In principle, the densities of the colors (M and Y) other than the background color are supposed to take on the same value in the neighborhood of the edge of the black letter "A." The density variation is attributed to a minute error (color variation) occurring at the read position of the color scanner 1. A detailed description will be given later as to why the M and Y components vary in density in the neighborhood of the edge of the letter "A."

A description will now be given of a specific example in which the background sensing section 138 senses a background.

Figure 15:
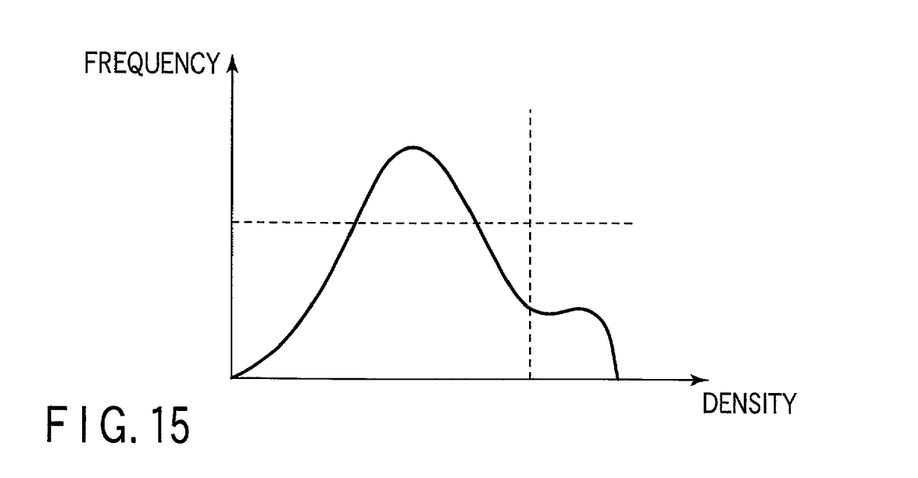
FIG. 15 shows an example of a density histogram of a case where the background is detectable.
Figure 16:
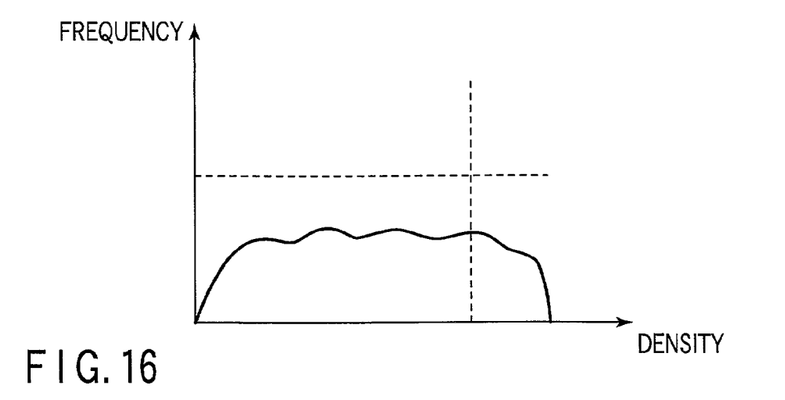
FIG. 16 shows an example of a density histogram of a case where the background is not detectable.

The background sensing section 138 senses whether or not a background exists, and, when it does exist, senses a background density (or a background color). This sensing operation is based on the density histogram corresponding to the second region. FIG. 15 shows a density histogram that is prepared with respect to the second region when the background sensing section 138 can sense a background. FIG. 16 shows a density histogram that is prepared with respect to the second region when the background sensing section 138 cannot sense a background.

The background sensing section 138 prepares a density histogram corresponding to the second region containing a pixel of interest, and determines whether or not a background can be detected by checking a density which is lower than a predetermined value and which appears more than a predetermined number of times.

If, as shown in FIG. 15, the density histogram corresponding to the second region shows the presence of a density that appears in a concentrated way, then the background sensing section 138 determines that the density appearing in the concentrated way is a background density (background color).

If, as shown in FIG. 16, the density histogram corresponding to the second region shows that the background density does not appear in a concentrated way, then the background sensing section 138 determines that the background density (background color) cannot be sensed. This determination, i.e., the determination that the background density cannot be sensed, is made when halftone dots exit in the background of a character or letter or when a complex image is included in the background.

As described above, the background sensing section prepares a histogram regarding the densities of color components with respect to the second region which is in the neighborhood of the pixel of interest. The sensed density is determined to represent a background density when it is within a range that is lower than a predetermined value, and when it repeatedly appears more than a predetermined number of times and the number of times it appears is the largest. Owing to this feature, the background color can be detected reliably and accurately.

When the background sensing section cannot detect a background, it outputs a sensing result signal indicating that the sensing operation results in failure. When the background of a character or letter is complex, the character determination section or the color determination section or the color determination section can select a determination method in consideration of the situation wherein the background sensing results in failure.

The background sensing section outputs a background sensing result indicating that the background of a character or letter is white or another color or density. Thus, character or color determination based on the background color is enabled.

A description will now be given of the manner in which color determination is executed with respect to the edge of letter "A."

Figure 17:
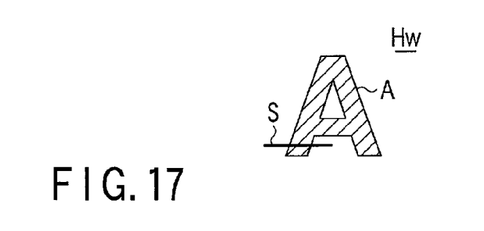
FIG. 17 shows an example of a read position at which a character on a white background is read.
Figure 18:
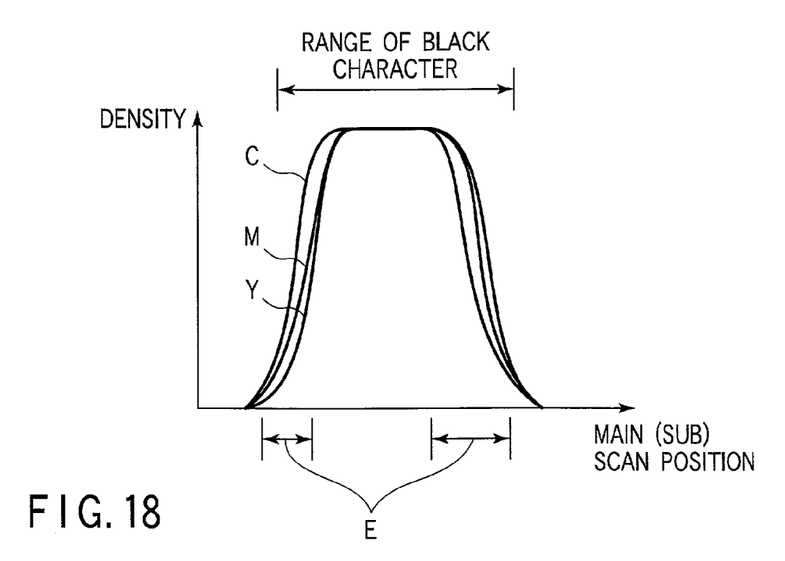
FIG. 18 shows how each color component is distributed with respect to the read position in FIG. 17.

FIG. 18 shows how the densities of color components are distributed when part of letter "A" on a white background Hw is scanned, such as the letter shown in FIG. 17. In the example shown in FIG. 17, the color scanner 1 reads or scans the letter "A" on the white background Hc in such a manner that the read position S crosses part of the letter "A." The densities of the color components the color scanner 1 reads with respect to the read position S vary in the neighborhood of the edge of the letter "A", as shown in FIG. 18.

This density variation is attributed to the color (CMY) components being varied at the edge of letter "A" when they are read by the color scanner 1. In principle, the densities of the colors (CMY) are supposed to take on the same value in the neighborhood of the edge of the black letter "A." In actuality, however, the color scanner 1 inevitably undergoes a minute error (color variation). For this reason, the densities of the color components vary in the neighborhood of the edge, as shown in FIG. 18.

If this color component variation occurs, even a black character or letter is mistakenly determined as a colored (chromatic) character or letter since its chroma increases at the edge thereof. If the determination that the edge of the character or letter is chromatic is not properly dealt with, the color printer 2 prints the black character or letter, coloring the region in the neighborhood of the letter.

To solve this problem, the color determination methods use different methods to determine "chromatic" or "achromatic." For example, a reference value (or a determination method) that easily leads to the determination of being "achromatic" may be used when determination is made with respect to the region in the neighborhood of the edge (i.e., the region where the feature amount [edge feature amount] tends to be large). Alternatively, determination of "chromatic" or "achromatic" may be made with respect to the region in the neighborhood of the edge (i.e., the region where the edge feature amount tends to be large) by using information regarding the inside of a character (i.e., the portion of higher density) (in other words, the information on the region in the neighborhood of the edge are not used).

In the manner described above, the color determination sections use different methods to determine "chromatic" or "achromatic." The color determination selector section selects one of the determination results obtained by the color determination sections, on the basis of a feature amount or a background sensing result. Owing to this feature, the possibility of the determination being "achromatic" increases in the neighborhood of the edge of a character or letter. Since an erroneous sensing of color is prevented in the neighborhood of an edge, accurate determination of a black character is thus ensured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for processing color images, comprising:
    a feature amount calculation section for calculating a feature amount with respect to a pixel of interest;
    a background sensing section for sensing a background density or a background color with respect to a region surrounding the pixel of interest whose feature amount is calculated by the feature amount calculation section;
    a plurality of character determination sections for determining whether the pixel of interest corresponds to a character or a line drawing on the basis of the feature amount calculated by the feature amount calculation section, said plurality of character determination sections using mutually different determination methods; and
    a character determination selector section for selecting one of determination results output from the character determination sections in accordance with a sensing result output from the background sensing section.

2. An image processing apparatus according to claim 1, wherein different reference values are set to said character determination sections, and each of said character determination sections compares a reference value assigned thereto with the feature amount calculated by the feature amount calculation section, thereby determining whether the pixel of interest corresponds to the character or the line drawing.

3. An image processing apparatus according to claim 1, wherein said feature amount calculation section calculates a feature amount of the pixel of interest by using a first region defined surrounding the pixel of interest, and said background sensing section senses a background density or a background color regarding a region surrounding the pixel of interest by using a second region which is similar in size to the first region or greater than the first region.

4. An image processing apparatus according to claim 1, wherein said background sensing section senses the background density or background color by using only those pixels which the determination result selected by the character determination selector section regards as an object other than the character or line drawing.

5. An image processing apparatus according to claim 1, wherein said feature amount calculation section calculates the feature amount on the basis of density gradients or distances in a color space between pixels detected in different directions with respect to a predetermined region surrounding the pixel of interest.

6. An image processing apparatus according to claim 1, wherein said background sensing section prepares a histogram regarding a density detected in a predetermined region surrounding the pixel of interest, and determines that a sensed density is a background density when the sensed density is within a range that is lower than a predetermined value, and when the sensed density repeatedly appears more than a predetermined number of times and the number of times the sensed density appears is largest.

7. An image processing apparatus according to claim 1, wherein:
    when the background sensing section fails to detect the background density or background color of a character, the background sensing section outputs a sensing result signal indicating that a background sensing operation results in failure;

said plurality of character determination sections include at least one character determination section that determines whether the pixel of interest represents a character or a line drawing by using a determination method suited to a case where the background density or the background color cannot be detected; and when said character determination selector section receives from the background sensing section the signal indicating that the background sensing operation results in failure, said character determination selector section selects a determination result output from said at least one character determination section, which determines whether the pixel of interest represents a character or a line drawing by using a determination method suited to a case where the background density or the background color cannot be detected.

8. An image processing apparatus according to claim 1, wherein:

said background sensing section senses whether the background of a character is white or a color other than white;

said plurality of character determination sections include a character determination section for determining whether a pixel represents a character or a line drawing by using a determination method suited to a case where the background is white, and a character determination section for determining whether a pixel represents a character or a line drawing by using a determination method suited to a case where the background is other than white; and said character determination selector section selects a determination result output from the character determination section that determines whether a pixel represents a character or a line drawing by using the determination method suited to the case where the background is white, when the background of the character is sensed as being white by the background sensing section, and selects a determination result output from the character determination section that determines whether a pixel represents a character or a line drawing by using the determination method suited to the case where the background is other than white, when the background of the character is sensed as being other than white by the background sensing section.

9. An image processing apparatus according to claim 1, wherein said background sensing section is a low-pass filter, and said feature amount calculation section is a high-pass filter.

* * * * *